(12) United States Patent
Peng et al.

(10) Patent No.: US 10,655,982 B2
(45) Date of Patent: May 19, 2020

(54) METHOD AND DEVICE FOR GENERATING POSITION INFORMATION OF TARGET OBJECT

(71) Applicant: BAIDU ONLINE NETWORK TECHNOLOGY (BEIJING) CO., LTD., Beijing (CN)

(72) Inventors: Weilin Peng, Beijing (CN); Li Yu, Beijing (CN); Shengpan Xu, Beijing (CN); Hailong Tian, Beijing (CN); Shiyu Song, Beijing (CN); Fangfang Dong, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 62 days.

(21) Appl. No.: 15/784,908

(22) Filed: Oct. 16, 2017

(65) Prior Publication Data

US 2019/0025075 A1  Jan. 24, 2019

(30) Foreign Application Priority Data

Jul. 21, 2017 (CN) .......................... 2017 1 0601455

(51) Int. Cl.
| | |
|---|---|
| *G01C 21/36* | (2006.01) |
| *G01S 17/89* | (2020.01) |
| *G01S 17/87* | (2020.01) |
| *G05D 1/02* | (2020.01) |
| *G06T 7/70* | (2017.01) |

(52) U.S. Cl.
CPC .......... *G01C 21/3697* (2013.01); *G01S 17/87* (2013.01); *G01S 17/89* (2013.01); *G05D 1/0274* (2013.01); *G06T 7/70* (2017.01); *G06T 2207/10028* (2013.01)

(58) Field of Classification Search
CPC .. G01C 21/3697; G01S 17/89; G05D 1/0274; G06T 2207/10028; G06T 7/70
See application file for complete search history.

(56) References Cited

U.S. PATENT DOCUMENTS

| | | | | |
|---|---|---|---|---|
| 7,283,657 | B1 * | 10/2007 | Carlson .................. | A63B 45/02 |
| | | | | 382/100 |
| 2008/0315039 | A1 * | 12/2008 | Rudd ....................... | B64G 1/24 |
| | | | | 244/164 |

(Continued)

*Primary Examiner* — Redhwan K Mawari
(74) *Attorney, Agent, or Firm* — Knobbe, Martens Olson & Bear, LLP

(57) ABSTRACT

Disclosed embodiments include a method and a device for generating position information of a target object. In some embodiments, the method comprises: obtaining target point cloud data of the target object, acquired by a target scanner at a target position, and position information of the target scanner, and obtaining reference point cloud data of the target object, acquired by a reference scanner at a reference position, and position information and an Euler angle of the reference scanner; obtaining an Euler angle of the target scanner based on the target point cloud data, the reference point cloud data, and the Euler angle of the reference scanner; and generating the position information of the target object based on the target point cloud data, the position information and the Euler angle of the target scanner, the reference point cloud data, and the position information and the Euler angle of the reference scanner.

15 Claims, 3 Drawing Sheets

(56) References Cited

U.S. PATENT DOCUMENTS

| | | | |
|---|---|---|---|
| 2010/0139437 A1* | 6/2010 | Ichikawa | B25J 9/1612 74/490.05 |
| 2014/0244210 A1* | 8/2014 | Cobbin | G01B 21/22 702/151 |
| 2018/0106898 A1* | 4/2018 | Baskaran | G01S 13/723 |
| 2019/0025075 A1* | 1/2019 | Peng | G01C 21/3697 |

* cited by examiner

METHOD AND DEVICE FOR GENERATING POSITION INFORMATION OF TARGET OBJECT

CROSS-REFERENCE TO RELATED APPLICATION

This application claims the benefit of Chinese Application No. 201710601455.2, filed on Jul. 21, 2017, entitled "Method and Device for Generating Position Information of Target Object,", which is hereby incorporated by reference in its entirety.

TECHNICAL FIELD

The present disclosure relates to the technical field of computers, specifically to the technical field of Internet, and more specifically to a method and device for generating position information of a target object.

BACKGROUND

An unmanned vehicle is a novel intelligent vehicle, also known as a "wheeled mobile robot," which acquires data from its surrounding environment mainly through sensors (laser radars, cameras and the like), and after executing comprehensive analysis and operation on these data, gives commands and instructions to respectively control different devices in the unmanned vehicle, to implement full-automatic operation of the vehicle, and reach the goal of unmanned vehicle driving.

For the unmanned vehicle, it is very important to accurately distinguish traffic lights. However, due to the influence of light, rainwater and other external factors, the difficulty for the unmanned vehicle to identify the traffic signals is greatly increased. In order to solve this problem, it is highly necessary to obtain position information of the traffic lights beforehand.

SUMMARY

The objective of embodiments of the present disclosure is to provide an improved method and device for generating position information of a target object, to solve the technical problems mentioned in the above background section.

In a first aspect, some embodiments of the present disclosure provide a method for generating position information of a target object, the method comprising: obtaining target point cloud data of the target object, acquired by a target scanner at a target position, and position information of the target scanner, and obtaining reference point cloud data of the target object, acquired by a reference scanner at a reference position, and position information and an Euler angle of the reference scanner, wherein the target point cloud data includes offsets between a center of the target scanner and each target point in a target point cloud, and the reference point cloud data includes offsets between a center of the reference scanner and each reference point in a reference point cloud; obtaining an Euler angle of the target scanner based on the target point cloud data, the reference point cloud data and the Euler angle of the reference scanner; and generating the position information of the target object based on the target point cloud data, the position information and the Euler angle of the target scanner, the reference point cloud data, and the position information and the Euler angle of the reference scanner.

In some embodiments, the obtaining the Euler angle of the target scanner based on the target point cloud data, the reference point cloud data and the Euler angle of the reference scanner comprises: partitioning the target point cloud and the reference point cloud into a plurality of cubes with a preset size respectively; executing the following determination steps: for each partitioned cube, fitting a plane by using points in the cube, determining whether the standard deviation of the distances from the points in the cube to the fitted plane is smaller than a standard deviation threshold, if the standard deviation is smaller than the standard deviation threshold, using the fitted plane as a first plane and determining whether the cube meets a preset condition at the same time: a number of points in the cube is smaller than a preset number of points and side lengths of the cube are smaller than a preset side length, and if the preset condition is met at the same time, using the first plane as a second plane; obtaining centroid coordinates and normal vectors of the obtained second planes, wherein the obtained second planes include second planes corresponding to the target point cloud and second planes corresponding to the reference point cloud; generating an optimal Euler angle difference between the target scanner and the reference scanner based on the centroid coordinates and the normal vectors of the obtained second planes; and generating an Euler angle of the target scanner based on the Euler angle of the reference scanner, and the optimal Euler angle difference between the target scanner and the reference scanner.

In some embodiments, the obtaining the Euler angle of the target scanner based on the target point cloud data, the reference point cloud data and the Euler angle of the reference scanner further comprises: in response to determining that the standard deviation of the distances from points in the cube to the fitted plane is not smaller than the standard deviation threshold, or in response to determining that the cube does not meet the preset condition, partitioning the cube into a preset number of cubes with an identical size, and continuing executing the determination steps.

In some embodiments, the generating an optimal Euler angle difference between the target scanner and the reference scanner based on the centroid coordinates and the normal vectors of the obtained second planes comprises: constructing a sum function of the distances between the second planes corresponding to the target point cloud and the second planes corresponding to the reference point cloud by use of the centroid coordinates and the normal vectors of the obtained second planes, and the Euler angle differences between the target scanner and the reference scanner; and determining an Euler angle difference minimizing a value of the sum function of the distances, and using the Euler angle difference as an optimal Euler angle difference.

In some embodiments, the generating the position information of the target object based on the target point cloud data, the position and the Euler angle of the target scanner, the reference point cloud data, and the position information and the Euler angle of the reference scanner comprises: converting the target point cloud data into position information of target points in the target point cloud using the position information and the Euler angle of the target scanner, and converting the reference point cloud data into position information of reference points in the reference point cloud using the position information and the Euler of the reference scanner; rendering a point cloud of the target object based on the position information of the target points in the target point cloud, and the position information of the reference points in the reference point cloud; fitting a plane of the target object by use of the point cloud of the target object; and obtaining a centroid coordinate of the plane of the target object, and using the centroid coordinate as the position information of the target object.

In some embodiments, a method adopted for fitting the plane comprises a random sample consensus algorithm or a least square method.

In some embodiments, the method further comprises: searching a position indicated by the position information of the target object on a pre-generated map, and marking the target object at the searched position.

In a second aspect, some embodiments of the present disclosure provide a device for generating position information of a target object, the device comprising: a first obtaining unit configured for obtaining target point cloud data of the target object, acquired by a target scanner at a target position, and position information of the target scanner, and obtaining reference point cloud data of the target object, acquired by a reference scanner at a reference position, and position information and an Euler angle of the reference scanner, wherein the target point cloud data includes offsets between a center of the target scanner and each target point in a target point cloud, and the reference point cloud data includes offsets between a center of the reference scanner and each reference point in a reference point cloud; a second obtaining unit configured for obtaining an Euler angle of the target scanner based on the target point cloud data, the reference point cloud data and the Euler angle of the reference scanner; and a generating unit configured for generating the position information of the target object based on the target point cloud data, the position information and the Euler angle of the target scanner, the reference point cloud data, and the position information and the Euler angle of the reference scanner.

In some embodiments, the second obtaining unit comprises: a partitioning subunit configured for partitioning the target point cloud and the reference point cloud into a plurality of cubes with a preset size respectively; a determining subunit configured for executing the following determination steps: for each partitioned cube, fitting a plane by using points in the cube, determining whether the standard deviation of the distances from the points in the cube to the fitted plane is smaller than a standard deviation threshold, if the standard deviation is smaller than the standard deviation threshold, using the fitted plane as a first plane and determining whether the cube meets a preset condition at the same time: a number of points in the cube is smaller than a preset number of points and side lengths of the cube are smaller than a preset side length, and if the preset condition is met at the same time, using the first plane as a second plane; a first obtaining subunit configured for obtaining centroid coordinates and normal vectors of obtained second planes, wherein the obtained second planes include second planes corresponding to the target point cloud and second planes corresponding to the reference point cloud; a first generating subunit configured for generating an optimal Euler angle difference between the target scanner and the reference scanner based on the centroid coordinates and the normal vectors of the obtained second planes; and a second generating unit configured for generating the Euler angle of the target scanner based on the Euler angle of the reference scanner, and the optimal Euler angle difference between the target scanner and the reference scanner.

In some embodiments, the second obtaining unit further comprises: an execution subunit configured for, in response to determining that the standard deviation of the distances from the points in the cube to the fitted plane is not smaller than the standard deviation threshold, or in response to determining that the cube does not meet the preset condition, partitioning the cube into a preset number of cubes with an identical size, and continuing executing the determination steps.

In some embodiments, the first generating subunit comprises: a construction module configured for constructing a sum function of the distances between the second planes corresponding to the target point cloud and the second planes corresponding to the reference point cloud by use of the centroid coordinates and the normal vectors of the obtained second planes, and the Euler angle differences between the target scanner and the reference scanner; and a determining module configured for determining an Euler angle difference minimizing a value of the sum function of the distances, and using the Euler angle difference as an optimal Euler angle difference.

In some embodiments, the generating unit comprises: a converting subunit configured for converting the target point cloud data into position information of target points in the target point cloud using the position information and the Euler angle of the target scanner, and converting the reference point cloud data into position information of reference points in the reference point cloud using the position information and the Euler of the reference scanner; a rendering subunit configured for rendering a point cloud of the target object based on the position information of the target points in the target point cloud, and the position information of the reference points in the reference point cloud; a fitting subunit configured for fitting a plane of the target object by use of the point cloud of the target object; and a second obtaining subunit configured for obtaining a centroid coordinate of the plane of the target object, and using the centroid coordinate as the position information of the target object.

In some embodiments, the method adopted for fitting the plane comprises a random sample consensus algorithm or a least square method.

In some embodiments, the device further comprises: a marking unit configured for searching a position indicated by the position information of the target object on a pre-generated map, and marking the target object at the searched position.

In a third aspect, some embodiments of the present disclosure provide a server comprising: one or more processors, and a storage device for storing one or more programs, wherein when the one or more programs are executed by the one or more processors, the one or more processors implement the method described by any implementation in the first aspect.

In a fourth aspect, some embodiments of the present disclosure provide a computer readable storage medium on which computer programs are stored, and when the computer programs are executed by the processors, the method described by any implementation in the first aspect is implemented.

According to the method and device for generating the position information of the target object, provided by some embodiments of the present disclosure, the following operations are executed: first, obtaining target point cloud data of the target object, acquired by a target scanner at a target position, and position information of the target scanner, and obtaining reference point cloud data of the target object, acquired by a reference scanner at a reference position, and position information and an Euler angle of the reference scanner; then, obtaining an Euler angle of the target scanner based on the target point cloud data, the reference point cloud data and the Euler angle of the reference scanner; and finally, generating the position information of the target object based on the target point cloud data, the position information and the Euler angle of the target scanner, the reference point cloud data, and the position information and the Euler angle of the reference scanner. Thus, the position information of the target object is accurately generated.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present disclosure will be further described below in detail in combination with the accompanying drawings and some embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and the features in some embodiments may be combined with each other on a non-conflict basis. The present disclosure will be described below in detail with reference to the accompanying drawings and in combination with some embodiments.

Figure 1:
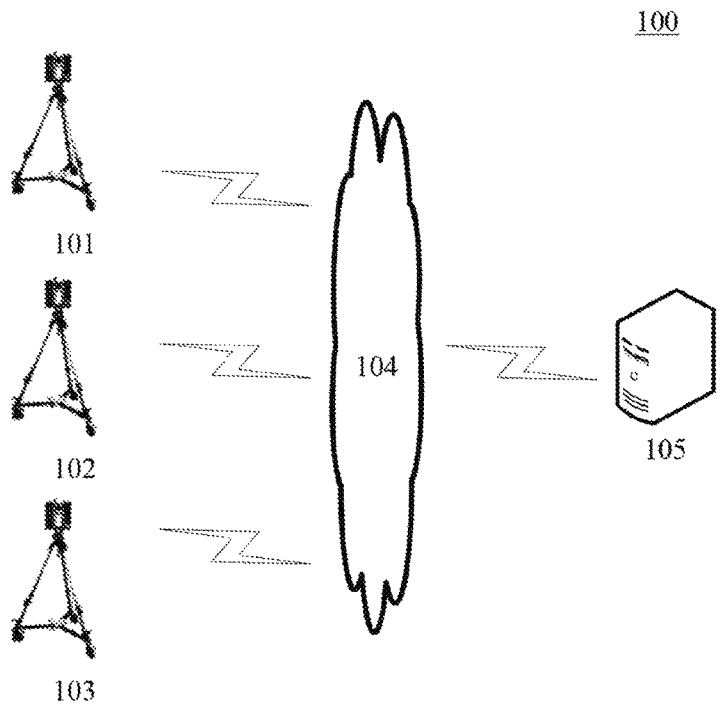
FIG. 1 is a system architecture diagram in which the present disclosure may be applied according to some embodiments.

FIG. 1 shows an architecture of a system 100 which may be used by a method or an apparatus for generating position information of a target object according to the present disclosure.

As shown in FIG. 1, a system architecture 100 may comprise target scanners 101 and 102, a reference scanner 103, a network 104 and a server 105. The network 104 is used for providing a medium of a communication link among the target scanners 101 and 102, the reference scanner 103 and the server 105. The network 104 may comprise various connection types, for example, wired and wireless communication links or optical fiber cables, and the like.

The target scanners 101 and 102 and the reference scanner 103 may be three-dimensional laser scanners or photographic scanners, and are used for acquiring point cloud data of a target object. A GPS (Global Positioning System) device may also be arranged in the target scanners 101 and 102 and the reference scanner, and is used for obtaining position information of the target scanners 101 and 102 and the reference scanner 103.

The target scanners 101 and 102 may interact with the server 105 through the network 104 to receive or send messages. For example, the target scanners 101 and 102 may send acquired target point cloud data of the target object and position information of the target scanners to the server 105 through the network 104.

The reference scanner 103 may interact with the server 105 through the network 104 to receive or send messages. For example, the reference scanner 103 may send acquired reference point cloud data of the target object and position information of the reference scanner to the server 105 through the network 104.

The server 105 can provide a variety of services, for example, the server 105 can perform analysis processing and the like on the data including the target point cloud data of the target object, acquired by the target scanners 101 and 102 at target positions, and position information of the target scanners 101 and 102, as well as reference point cloud data of the target object, acquired by the reference scanner 103 at a reference position, and position information and an Euler angle of the reference scanner 103, and the like, and generate processing results (e.g., the position information of the target object).

It should be noted that the method for generating the position information of the target object, provided by some embodiments of the present disclosure is generally executed by the server 105, and accordingly, the device for generating the position information of the target object is generally arranged in the server 105.

It should be appreciated that that the numbers of target scanners, reference scanners, networks, and servers in FIG. 1 are only schematic. Depending on implementation requirements, any number of the target scanners, the reference scanners, the networks, and the servers may be provided.

Figure 2:
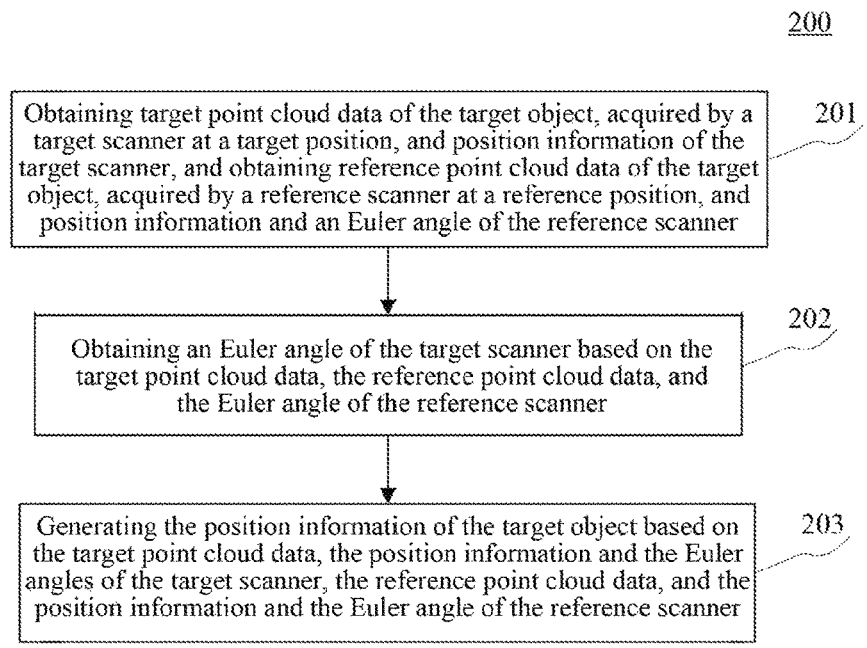
FIG. 2 is a flow diagram of some embodiments of the method for generating the position information of the target object according to the present disclosure.

Further refer to FIG. 2, which shows a process 200 of some embodiments of the method for generating the position information of the target object according to the present disclosure, the method for generating the position information of the target object comprises the following steps:

Step 201, obtaining target point cloud data of the target object, acquired by a target scanner at a target position, and position information of the target scanner, and obtaining reference point cloud data of the target object, acquired by a reference scanner at a reference position, and position information and an Euler angle of the reference scanner.

In some embodiments, the electronic device (e.g., the server 105 shown in FIG. 1) on which the method for generating the position information of the target object is operated can obtain the target point cloud data of the target object, acquired by a target scanner (e.g., the target scanners 101 and 102 shown in FIG. 1) at a target position, and position information of the target scanner, and simultaneously, obtain the reference point cloud data of the target object, acquired by the reference scanner (e.g., the reference scanner 103 shown in FIG. 1) at a reference position, and position information and an Euler angle of the reference scanner.

In some embodiments, the target scanner and the reference scanner may be three-dimensional laser scanners or photographic scanners, and can be used for acquiring point cloud data of the target object. Here, a data acquisition operator may select target positions and a reference position near the target object beforehand, places the target scanner and the reference scanner at the target position and the reference position respectively, and then turns on the target scanner and the reference scanner to acquire target point cloud data and reference point cloud data of the target object. Wherein, the target point cloud data may include offsets between a center of the target scanner and each target point in a target point cloud, and specifically, the target point cloud data may be a three-dimensional coordinate in a local coordinate system using the center of the target scanner as an origin of the coordinate. The reference point cloud data may include offsets between a center of the reference scanner and each reference point in a reference point cloud, and specifically, the reference point cloud data may be a three-dimensional coordinate in a local coordinate system using the center of the target scanners as an origin of the coordinate.

In some embodiments, GPS devices may be installed in the target scanner and the reference scanner, and may be used for obtaining the position information of the target scanner and the reference scanner. Specifically, the position information of the target scanner may be a three-dimensional coordinate of the center of the target scanner in a world coordinate system. The position information of the reference scanner may be a three-dimensional coordinate of the center of the reference scanner in the world coordinate system.

In some embodiments, the target object may include, but is not limited to: a traffic light, a traffic sign, a road traffic marking, and the like.

In some embodiments, because the earth is an ellipsoid and the surface of the earth is not smooth, when the target scanner and the reference scanner are placed on an uneven ground surface, each of the target scanner and the reference scanner will have an Euler angle relative to a geodetic coordinate system. Specifically, the Euler angle may include a yaw, a pitch or a roll. Here, in order to improve the accuracy of the generated position information of the target object, a plurality of target positions and a reference position are selected in general, and the data acquisition operator can manually measure the Euler angle of the reference scanner placed at the reference position.

Step 202, obtaining an Euler angle of the target scanner based on the target point cloud data, the reference point cloud data and the Euler angle of the reference scanner.

In some embodiments, based on the target point cloud data, the reference point cloud data and the Euler angle of the reference scanner, which are obtained in step 201, the electronic device may obtain the Euler angle of the target scanner.

In some embodiments, because the target point cloud data and the reference point cloud data are point cloud data of the same target object, which are acquired by the target scanner and the reference scanner at different positions, there is a certain incidence relation among the target point cloud data, the reference point cloud data, the Euler angle of the reference scanner and the Euler angle of the target scanner, and under the condition that the target point cloud data, the reference point cloud data and the Euler angle of the reference scanner are known, the electronic device may obtain the Euler angle of the target scanner based on the incidence relation.

Step 203, generating the position information of the target object based on the target point cloud data, the position information and the Euler angle of the target scanner, the reference point cloud data, and the position information and the Euler angle of the reference scanner.

In some embodiments, based on the target point cloud data, the position information of the target scanner, the reference point cloud data, and the position information and the Euler angle of the reference scanner, which are obtained in step 201, and the Euler angle of the target scanner obtained in step 202, the electronic device may generate the position information of the target object. Wherein, the position information of the target object may be a three-dimensional coordinate of the target object in the world coordinate system.

In some embodiments, under the condition that the position information and the Euler angle of the target scanner are known, the electronic device may obtain translation information and rotation information, relative to the world coordinate system, of a local coordinate system using the center of the target scanner as an origin of a coordinate, and based on the translation information and the rotation information, relative to the world coordinate system, of the local coordinate system using the center of the target scanner as the origin of coordinate, the electronic device converts the target point cloud data into point cloud data in the world coordinate system. Likewise, the electronic device may also convert the reference point cloud data into point cloud data in the world coordinate system. Wherein, the converted point cloud data in the world coordinate system may include three-dimensional coordinates of the points of the target object in the world coordinate system.

In some optional implementations of some embodiments, after the position information of the target object is generated, the electronic device may also search a position indicated by the position information of the target object on a pre-generated map, and mark the target object at the searched position. As an example, under the condition that the target object is a traffic light, the electronic device may mark the traffic light at the position indicated by the position information of the traffic light on the map, and associate the traffic light with road traffic markings.

According to the method and device for generating the position information of the target object, provided by some embodiments of the present disclosure, the following operations are executed: first, obtaining target point cloud data of the target object, acquired by a target scanner at a target position, and position information of the target scanner, and obtaining reference point cloud data of the target object, acquired by a reference scanner at a reference position, and position information and an Euler angle of the reference scanner; then, obtaining an Euler angle of the target scanner based on the target point cloud data, the reference point cloud data and the Euler angle of the reference scanner; and finally, generating the position information of the target object based on the target point cloud data, the position information and the Euler angle of the target scanner, the reference point cloud data, and the position information and the Euler angle of the reference scanner. Thus, the position information of the target object is accurately generated.

Figure 3:
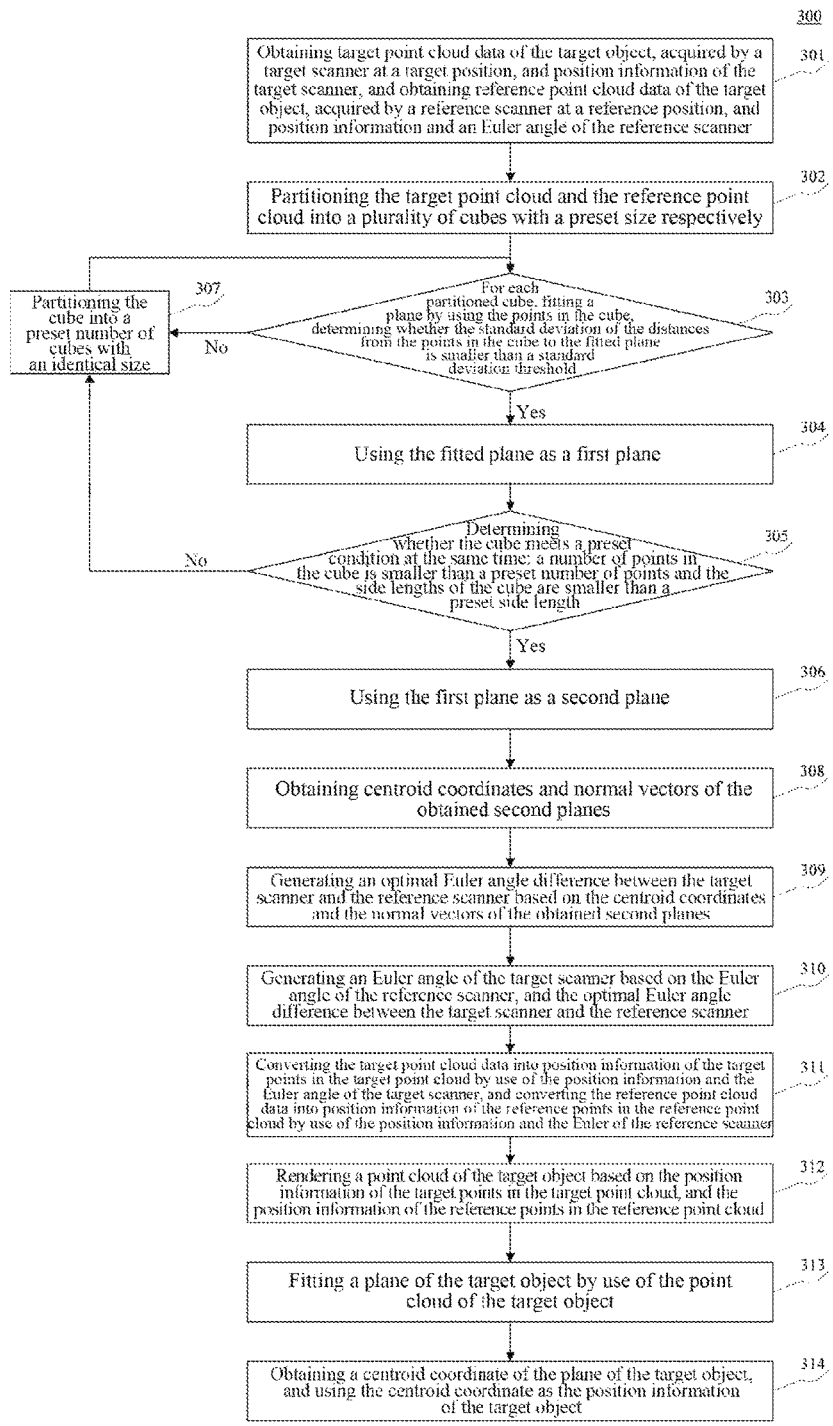
FIG. 3 is a flow diagram of some embodiments of the method for generating the position information of the target object according to the present disclosure.

Further refer to FIG. 3, which shows a process 300 of some embodiments of the method for generating the position information of the target object. The process 300 of the method for generating the position information of the target object comprises the following steps:

Step 301, obtaining target point cloud data of the target object, acquired by a target scanner at a target position, and position information of the target scanner, and obtaining reference point cloud data of the target object, acquired by a reference scanner at a reference position, and position information and an Euler angle of the reference scanner.

In some embodiments, the electronic device (e.g., the server 105 shown in FIG. 1) on which the method for generating the position information of the target object is operated can obtain the target point cloud data of the target object, acquired by the target scanner (e.g., the target scanners 101 and 102 shown in FIG. 1) at a target position, and position information of the target scanner, and simultaneously, the electronic device can obtain the reference point cloud data of the target object, acquired by the reference scanner (e.g., the reference scanner 103 shown in FIG. 1) at a reference position, and position information and an Euler angle of the reference scanner. The target point cloud data may include offsets between a center of the target scanner and each target point in a target point cloud, and the reference point cloud data may include offsets between a center of the reference scanner and each reference point in a reference point cloud.

Step 302, partitioning the target point cloud and the reference point cloud into a plurality of cubes with a preset size respectively.

In some embodiments, the electronic device may partition the target point cloud and the reference point cloud into a plurality of cubes with a preset size respectively. Wherein, the target point cloud is a point cloud of the target object acquired by the target scanner, and the reference point cloud is a point cloud of the target object acquired by the reference scanner.

Step 303, for each partitioned cube, fitting a plane by using points in the cube, determining whether the standard deviation of the distances from points in the cube to the fitted plane is smaller than a standard deviation threshold.

In some embodiments, for each partitioned cube, the electronic device may firstly fit a plane by using the points in the cube, then determining whether the standard deviation of the distances from the points in the cube to the fitted plane is smaller than a standard deviation threshold, executing step 304 if the standard deviation is smaller than the standard deviation threshold, and executing step 307 if the standard deviation is not smaller than the standard deviation threshold. Wherein, the standard deviation threshold is a preset numerical value. The distances from the points in the cube to the plane which is fitted by using the points in the cube are as small as possible.

In some optional implementations of some embodiments, a method adopted by the electronic device to fit a plane includes an RANSAC (random sample consensus) algorithm or a least square method.

Step 304, using the fitted plane as a first plane.

In some embodiments, under the condition that the standard deviation of the distances from the points in the cube to the fitted plane is smaller than the standard deviation threshold, the electronic device may take the fitted plane as the first plane, and step 305 is executed.

Step 305, determining whether the cube meets a preset condition at the same time: a number of points in the cube is smaller than a preset number of points and side lengths of the cube are smaller than a preset side length.

In some embodiments, the electronic device may determine whether the cube meets a preset condition at the same time: a number of points in the cube is smaller than a preset number of points and side lengths of the cube are smaller than a preset side length; if the preset condition is met at the same time, step 306 is executed; and if the preset condition is not met, step 307 is executed.

Step 306, using the first plane as a second plane.

In some embodiments, the electronic device may take the first plane as the second plane, and then step 308 is executed.

Step 307, partitioning the cube into a preset number of cubes with an identical size.

In some embodiments, after determining that the standard deviation of the distances from the points in the cube to the fitted plane is not smaller than the standard deviation threshold or determining that the cube does not meet the preset condition, the electronic device may partition the cube into a preset number (e.g., 8) of cubes with an identical size, and returns to execute step 303.

Step 308, obtaining centroid coordinates and normal vectors of the obtained second planes.

In some embodiments, the electronic device may obtain the centroid coordinates and the normal vectors of the obtained second planes. Wherein, the centroid coordinates are coordinates of mean positions for distribution of the points on the second planes. The obtained second planes may include the second planes corresponding to the target point cloud and the second planes corresponding to the reference point cloud.

Step 309, generating an optimal Euler angle difference between the target scanner and the reference scanner based on the centroid coordinates and the normal vectors of the obtained second planes.

In some embodiments, based on the centroid coordinates and the normal vectors of the second planes obtained in step 308, the electronic device may generate the optimal Euler angle difference between the target scanner and the reference scanner.

In some optional implementations of some embodiments, the electronic device may firstly construct a sum function of the distances between the second planes corresponding to the target point cloud and the second planes corresponding to the reference point cloud by use of the centroid coordinates and the normal vectors of the obtained second planes, and the Euler angle differences between the target scanners and the reference scanner, and then determine an Euler angle difference minimizing a value of the sum function of the distances and take the Euler angle difference as an optimal Euler angle difference.

As an example, under the condition that a data acquisition operator selects two target positions and one reference position, the electronic device may construct a sum function Y of distances:

$$Y = \sum_i \| (\Delta p \cdot x_i^{M_1} - x_i^{M_2}) \cdot n_i^{M_1} \|^2 + \sum_i \| (\Delta p \cdot x_i^{M_1} - x_i^{M_3}) \cdot n_i^{M_1} \|^2.$$

Wherein, the value range of i is a positive integer between 1 and the number of the second planes corresponding to the target point cloud or the reference point cloud, x is a centroid coordinate of the second planes, $x_i$ is the centroid coordinate of the $i^{th}$ second plane, $x_i^{M_1}$ is the centroid coordinate of the $i^{th}$ second plane corresponding to the reference point cloud, $x_i^{M_2}$ is the centroid coordinate of the $i^{th}$ second plane corresponding to the target point cloud acquired at a first target position, $x_i^{M_3}$ is the centroid coordinate of the $i^{th}$ second plane corresponding to the target point cloud acquired at a second target position, n is the normal vector of the second planes, $n_i$ is the normal vector of the $i^{th}$ second plane, $n_1^{M_1}$ is the normal vector of the $i^{th}$ second plane corresponding to the reference point cloud, and $\Delta p$ is the Euler angle difference between the target scanner and the reference scanner.

Wherein, the electronic device may generate the optimal Euler angle difference $\Delta p_0$ through the following formula:

$$\Delta p_0 = \mathrm{argmin} \left\{ \sum_i \| (\Delta p \cdot x_i^{M_1} - x_i^{M_2}) \cdot \right.$$

$$n_i^{M_1}\|^2 + \sum_i \|(\Delta p \cdot x_i^{M_1} - x_i^{M_3}) \cdot n_i^{M_1}\|^2 \Bigg\}.$$

Step 310, generating an Euler angle of the target scanner based on the Euler angle of the reference scanner, and the optimal Euler angle difference between the target scanner and the reference scanner.

In some embodiments, based on the Euler angle of the reference scanner, and the optimal Euler angle difference between the target scanner and the reference scanner, which are generated in step 309, the electronic device may generate the Euler angle of the target scanner.

As an example, the electronic device may generate the Euler angle $\hat{p}_k$ of the target scanner through the following formula:

$$\hat{p}_k = \Delta p_0 \bar{p}_k.$$

Wherein, $\Delta p_0$ is the optimal Euler angle difference between the target scanner and the reference scanner, and $\bar{p}_k$ is the Euler angle of the reference scanner.

Step 311, converting the target point cloud data into position information of the target points in the target point cloud by use of the position information and the Euler angle of the target scanner, and converting the reference point cloud data into position information of the reference points in the reference point cloud by use of the position information and the Euler of the reference scanner.

In some embodiments, the electronic device may convert the target point cloud data into position information of the target points in the target point cloud by use of the position information and the Euler angle of the target scanner, and convert the reference point cloud data into position information of the reference points in the reference point cloud by use of the position information and the Euler of the reference scanner. Wherein, the position information of the target points in the target point cloud may be three-dimensional coordinates of the target points in the target point cloud in a world coordinate system. The position information of the reference points in the reference point cloud may be three-dimensional coordinates of the reference points in the reference point cloud in the world coordinate system.

In some embodiments, under the condition that the position information and the Euler angle of the target scanner are known, the electronic device may obtain translation information and rotation information, relative to the world coordinate system, of a local coordinate system using a center of the target scanner as an origin of a coordinate, and based on the translation information and the rotation information, relative to the world coordinate system, of the local coordinate system using the center of the target scanner as the origin of the coordinate, the electronic device converts the offsets between the center of the target scanner and each target point in the target point cloud into position information of the target points in the target point cloud in the world coordinate system. Likewise, the electronic device may also convert the offsets between the center of the reference scanner and each reference point in the reference point cloud into position information of the reference points in the reference point cloud in the world coordinate system.

Step 312, rendering a point cloud of the target object based on the position information of the target points in the target point cloud, and the position information of the reference points in the reference point cloud.

In some embodiments, based on the position information of the target points in the target point cloud and the position information of the reference points in the reference point cloud, which are converted in step 311, the electronic device may render a point cloud of the target object. Specifically, the electronic device may firstly search out the points in the world coordinate system, which are indicated by the position information of the target points in the target point cloud, and the points in the world coordinate system, which are indicated by the position information of the reference points in the reference point cloud, and then render the searched points, thereby obtaining the point cloud of the target object.

Step 313, fitting a plane of the target object by use of the point cloud of the target object.

In some embodiments, based on the point cloud of the target object rendered in step 312, the electronic device can fit a plane of the target object by use of the point cloud of the target object. Wherein, the distances from the points in the point cloud of the target object to the plane which is fitted by using the points of the point cloud of the target object are as small as possible. As an example, if the target object is a traffic light, and under the condition that the traffic light includes a plurality of bulbs, the point cloud of the traffic light can be artificially partitioned into a plurality of point clouds, wherein each point cloud includes and only includes the point cloud of one bulb; and then planes are fitted for the partitioned point clouds respectively.

In some optional implementations of some embodiments, a method adopted by the electronic device to fit planes includes an RANSAC algorithm or a least square method.

Step 314, obtaining a centroid coordinate of the plane of the target object, and using the centroid coordinate as the position information of the target object.

In some embodiments, based on the plane of the target object fitted in step 313, the electronic device may obtain a centroid coordinate of the plane of the target object, and takes the centroid coordinate as the position information of the target object. Wherein, the centroid coordinate is a coordinate of a mean position for distribution of the points on the plane of the target object.

It can be seen from FIG. 3 that compared with the corresponding embodiment of FIG. 2, the process 300 of the method for generating the position information of the target object in some embodiments highlights steps 302-314. Thus, the generated position information of the target object in the scheme described in some embodiments is more accurate.

Figure 4:
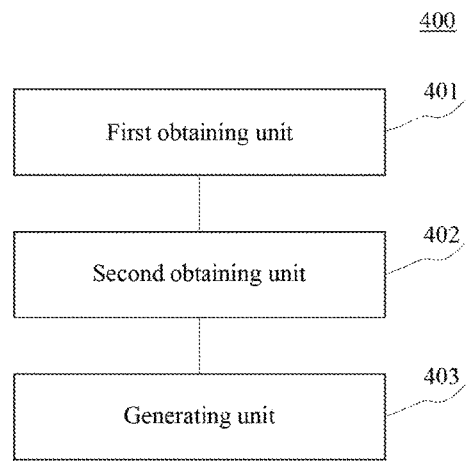
FIG. 4 is a structure diagram of some embodiments of the device for generating the position information of the target object according to the present disclosure.

Further refer to FIG. 4, as the implementation of the method shown by the abovementioned figures, the present disclosure provides some embodiments of the device for generating the position information of the target object, some embodiments of the device corresponds to some embodiments of the method shown in FIG. 2, and the device specifically can be applied to various types of electronic devices.

As shown in FIG. 4, the device 400 for generating the position information of the target object in some embodiments may comprise: a first obtaining unit 401, a second obtaining unit 402 and a generating unit 403. Wherein, the first obtaining unit 401 is configured for obtaining target point cloud data of the target object, acquired by a target scanner at a target position, and position information of the target scanner, and obtaining reference point cloud data of the target object, acquired by a reference scanner at a reference position, and position information and an Euler angle of the reference scanner, wherein the target point cloud data includes offsets between a center of the target scanner and each target point in a target point cloud, and the reference point cloud data includes offsets between a center of the reference scanner and each reference point in a reference point cloud; the second obtaining unit 402 is configured for obtaining Euler angle of the target scanner based on the target point cloud data, the reference point cloud data and the Euler angle of the reference scanner; and the generating unit 403 is configured for generating the position information of the target object based on the target point cloud data, the position information and the Euler angle of the target scanner, the reference point cloud data, and the position information and the Euler angle of the reference scanner.

In some embodiments, specific processing effects and technical effects brought by the first obtaining unit 401, the second obtaining unit 402 and the generating unit 403 in the device 400 for generating the position information of the target object can be referenced in related descriptions of step 201, step 202 and step 203 of the corresponding embodiment in FIG. 2 respectively, and will not be repeated herein.

In some optional implementations of some embodiments, the second obtaining unit 402 may comprise: a partitioning subunit (not shown in the Figs.) configured for partitioning the target point cloud and the reference point cloud into a plurality of cubes with a preset size respectively; a determining subunit (not shown in the Figs.) configured for executing the following determination steps: for each partitioned cube, fitting a plane by using the points in the cube, determining whether the standard deviation of the distances from the points in the cube to the fitted plane is smaller than a standard deviation threshold, if the standard deviation is smaller than the standard deviation threshold, using the fitted plane as a first plane and determining whether the cube meets a preset condition at the same time: a number of points in the cube is smaller than a preset number of points and side lengths of the cube are smaller than a preset side length, and if the preset condition is met at the same time, using the first plane as a second plane; a first obtaining subunit (not shown in the Figs.) configured for obtaining centroid coordinates and normal vectors of the obtained second planes, wherein the obtained second planes include the second planes corresponding to the target point cloud and the second planes corresponding to the reference point cloud; a first generating subunit (not shown in the Figs.) configured for generating an optimal Euler angle difference between the target scanner and the reference scanner based on the centroid coordinates and the normal vectors of the obtained second planes; and a second generating subunit (not shown in the Figs.) configured for generating the Euler angle of the target scanner based on the Euler angle of the reference scanner, and the optimal Euler angle difference between the target scanner and the reference scanner.

In some optional implementations of some embodiments, the second obtaining unit 402 may further comprise: an execution subunit (not shown in the Figs.) configured for, in response to determining that the standard deviation of the distances from the points in the cube to the fitted plane is not smaller than the standard deviation threshold, or in response to determining that the cube does not meet the preset condition, partitioning the cube into a preset number of cubes with an identical size, and continuing executing the determination steps.

In some optional implementations of some embodiments, the first generating subunit may comprise: a construction module (not shown in the Figs.) configured for constructing a sum function of the distances between the second planes corresponding to the target point cloud and the second planes corresponding to the reference point cloud by use of the centroid coordinates and the normal vectors of the obtained second planes, and the Euler angle differences between the target scanner and the reference scanner; and a determining module (not shown in the Figs.) configured for determining an Euler angle difference minimizing a value of the sum function of the distances, and using the Euler angle difference as an optimal Euler angle difference.

In some optional implementations of some embodiments, the generating unit 403 may comprise: a converting subunit (not shown in the Figs.) configured for converting the target point cloud data into position information of target points in the target point cloud using the position information and the Euler angle of the target scanner, and converting the reference point cloud data into position information of reference points in the reference point cloud using the position information and the Euler of the reference scanner; a rendering subunit (not shown in the Figs.) configured for rendering a point cloud of the target object based on the position information of the target points in the target point cloud, and the position information of the reference points in the reference point cloud; a fitting subunit (not shown in the Figs.) configured for fitting a plane of the target object by use of the point cloud of the target object; and a second obtaining subunit (not shown in the Figs.) configured for obtaining a centroid coordinate of the plane of the target object, and using the centroid coordinate as the position information of the target object.

In some optional implementations of some embodiments, a method adopted for fitting the plane may include a random sample consensus algorithm or a least square method.

In some optional implementations of some embodiments, the device 400 for generating the position information of the target object may further comprise: a marking unit (not shown in the Figs.) configured for searching a position indicated by the position information of the target object on a pre-generated map, and marking the target object at the searched position.

Figure 5:
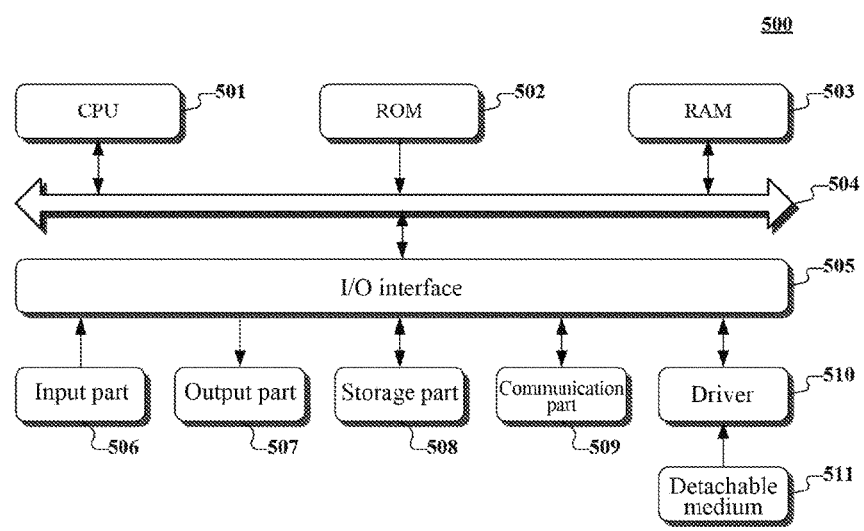
FIG. 5 is a schematic structural diagram of a computer system adapted to implement a server of some embodiments of the present disclosure.

Referring to FIG. 5, a schematic structural diagram of a computer system 500 adapted to implement a server of some embodiments of the present disclosure is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to some embodiments of the present disclosure, the process described above with reference to the flow chart may be implemented in a computer software program. For example, some embodiments of the present disclosure includes a computer program product, which comprises a computer program that is tangibly embedded in a machine-readable medium. The computer program comprises program codes for executing the method as illustrated in the flow chart. In such some embodiments, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

It needs to be noted that the computer readable medium in the present disclosure may be computer readable signal medium or computer readable storage medium or a combination thereof. An example of the computer readable storage medium may include but not limited to: systems, apparatus or elements of electric, magnet, optical, electromagnet, infrared ray, or semiconductor or a combination thereof. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or a combination thereof. In the present disclosure, the computer readable storage medium may be any physical medium containing or storing programs which can be used by a command execution system, apparatus or element or the incorporation thereof. In the present disclosure, the computer readable signal medium may include data signal in the base band or propagating as parts of a carrier in which computer readable program codes are carried. The propagated signal may take various forms, include but is not limited to: an electromagnetic signal, an optical signal or a combination thereof. The signal medium that can be read by computer may be any computer readable medium except for the computer readable storage medium. The computer readable medium is capable of transmitting, propagating or transferring programs for used by or used in combination with a command execution system, apparatus or element. The program codes contained on the computer readable medium may be transmitted with any suitable medium including but is not limited to: a wireless medium, a wired medium, an optical cable medium, a RF medium and the like, or any combination thereof.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in some embodiments of the present disclosure may be implemented by way of software or hardware. The described units or modules may also be provided in a processor, for example, described as: a processor, comprising a first obtaining unit, a second obtaining unit and a generating unit, where the names of these units or modules are not considered as a limitation to the units or modules. For example, the first obtaining unit may also be described as "a unit for obtaining target point cloud data of the target object, acquired by a target scanner at a target position, and position information of the target scanner, and obtaining reference point cloud data of the target object, acquired by a reference scanner at a reference position, and position information and an Euler angle of the reference scanner."

In another aspect, the present disclosure further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: obtaining target point cloud data of the target object, acquired by a target scanner at a target position, and position information of the target scanner, and obtaining reference point cloud data of the target object, acquired by a reference scanner at a reference position, and position information and an Euler angle of the reference scanner, wherein the target point cloud data includes offsets between a center of the target scanner and each target point in a target point cloud, and the reference point cloud data includes offsets between a center of the reference scanner and each reference point in a reference point cloud; obtaining an Euler angle of the target scanner based on the target point cloud data, the reference point cloud data and the Euler angle of the reference scanner; and generating the position information of the target object based on the target point cloud data, the position information and the Euler angle of the target scanner, the reference point cloud data, and the position information and the Euler angle of the reference scanner.

The foregoing is only a description of the embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present disclosure with (but not limited to), technical features with similar functions.

What is claimed is:

1. A method for generating position information of a target object, the method comprising:
obtaining target point cloud data of the target object, acquired by a target scanner at a target position, and position information of the target scanner, and obtaining reference point cloud data of the target object, acquired by a reference scanner at a reference position, and position information and an Euler angle of the reference scanner, wherein the target point cloud data includes offsets between a center of the target scanner and each target point in a target point cloud, and the reference point cloud data includes offsets between a center of the reference scanner and each reference point in a reference point cloud;

obtaining an Euler angle of the target scanner based on the target point cloud data, the reference point cloud data and the Euler angle of the reference scanner; and generating the position information of the target object based on the target point cloud data, the position information and the Euler angle of the target scanner, the reference point cloud data, and the position information and the Euler angle of the reference scanner.

2. The method according to claim 1, wherein the obtaining the Euler angle of the target scanner based on the target point cloud data, the reference point cloud data and the Euler angle of the reference scanner comprises:

partitioning the target point cloud and the reference point cloud into a plurality of cubes with a preset size respectively;

executing following determination steps: for each partitioned cube, fitting a plane by using points in the cube, determining whether standard deviations of the distances from the points in the cube to the fitted plane is smaller than a standard deviation threshold, if the standard deviations are smaller than the standard deviation threshold, using the fitted plane as a first plane, determining whether the cube meets a preset condition at the same time: a number of points in the cube is smaller than a preset number of points and side lengths of the cube are smaller than a preset side length, and if the preset condition is met at the same time, using the first plane as a second plane;

obtaining centroid coordinates and normal vectors of obtained second planes, wherein the obtained second planes comprise second planes corresponding to the target point cloud and second planes corresponding to the reference point cloud;

generating an optimal Euler angle difference between the target scanner and the reference scanner based on the centroid coordinate and the normal vectors of the obtained second planes; and generating the Euler angle of the target scanner based on the Euler angle of the reference scanner, and the optimal Euler angle difference between the target scanner and the reference scanner.

3. The method according to claim 2, wherein the obtaining the Euler angle of the target scanner based on the target point cloud data, the reference point cloud data and the Euler angle of the reference scanner further comprises:

in response to determining that the standard deviations of the distances from the points in the cube to the fitted plane are not smaller than the standard deviation threshold, or in response to determining that the cube does not meet the preset condition, partitioning the cube into a preset number of cubes with an identical size, and continuing executing the determination steps.

4. The method according to claim 2, wherein the generating an optimal Euler angle difference between the target scanner and the reference scanner based on the centroid coordinates and the normal vectors of the obtained second planes comprises:

constructing a sum function of distances between the second planes corresponding to the target point cloud and the second planes corresponding to the reference point cloud by use of the centroid coordinates and the normal vectors of the obtained second planes, and the Euler angle difference between the target scanner and the reference scanner; and determining an Euler angle difference minimizing a value of the sum function of the distances, and using the Euler angle difference as the optimal Euler angle difference.

5. The method according to claim 1, wherein the generating the position information of the target object, based on the target point cloud data, the position information and the Euler angle of the target scanner, the reference point cloud data, and the position information and the Euler angle of the reference scanner comprises:

converting the target point cloud data into position information of target points in the target point cloud using the position information and the Euler angle of the target scanner, and converting the reference point cloud data into position information of reference points in the reference point cloud using the position information and the Euler of the reference scanner;

rendering a point cloud of the target object based on the position information of the target points in the target point cloud, and the position information of the reference points in the reference point cloud;

fitting a plane of the target object using the point cloud of the target object; and obtaining a centroid coordinate of the plane of the target object, and using the centroid coordinate as the position information of the target object.

6. The method according to claim 2, wherein a method adopted for fitting the plane comprises a random sample consensus algorithm or a least square method.

7. The method according to claim 1, further comprising:

searching a position indicated by the position information of the target object on a pre-generated map, and marking the target object at the searched position.

8. A device for generating position information of a target object, the device comprising:

at least one processor; and a memory storing instructions, which when executed by the at least one processor, cause the at least one processor to perform operations, the operations comprising:

obtaining target point cloud data of the target object, acquired by a target scanner at a target position, and position information of the target scanner, and obtaining reference point cloud data of the target object, acquired by a reference scanner at a reference position, and position information and an Euler angle of the reference scanner, wherein the target point cloud data includes offsets between a center of the target scanner and each target point in a target point cloud, and the reference point cloud data includes offsets between a center of the reference scanner and each reference point in a reference point cloud;

obtaining an Euler angle of the target scanner based on the target point cloud data, the reference point cloud data and the Euler angle of the reference scanner; and generating the position information of the target object based on the target point cloud data, the position information and the Euler angle of the target scanner, the reference point cloud data, and the position information and the Euler angle of the reference scanner.

9. The device according to claim 8, wherein the obtaining the Euler angle of the target scanner based on the target point cloud data, the reference point cloud data and the Euler angle of the reference scanner comprises:

partitioning the target point cloud and the reference point cloud into a plurality of cubes with a preset size respectively;

executing following determination steps: for each partitioned cube, fitting a plane by using points in the cube, determining whether the standard deviations of the distances from the points in the cube to the fitted plane are smaller than a standard deviation threshold, if the standard deviation is smaller than the standard deviation threshold, using the fitted plane as a first plane and determining whether the cube meets a preset condition at the same time: a number of points in the cube is smaller than a preset number of points and the side lengths of the cube are smaller than a preset side length, and if the preset condition is met at the same time, using the first plane as a second plane;

obtaining centroid coordinates and normal vectors of obtained second planes, wherein the obtained second planes comprise second planes corresponding to the target point cloud and second planes corresponding to the reference point cloud;

generating an optimal Euler angle difference between the target scanner and the reference scanner based on the centroid coordinates and the normal vectors of the obtained second planes; and generating the Euler angle of the target scanner based on the Euler angle of the reference scanner, and the optimal Euler angle difference between the target scanner and the reference scanner.

10. The device according to claim 9, wherein the obtaining the Euler angle of the target scanner based on the target point cloud data, the reference point cloud data and the Euler angle of the reference scanner further comprises:

in response to determining that the standard deviation of the distances from the points in the cube to the fitted plane is not smaller than the standard deviation threshold, or in response to determining that the cube does not meet the preset condition, partitioning the cube into a preset number of cubes with an identical size, and continuing executing the determination steps.

11. The device according to claim 9, wherein the generating an optimal Euler angle difference between the target scanner and the reference scanner based on the centroid coordinates and the normal vectors of the obtained second planes comprises:

constructing a sum function of distances between the second planes corresponding to the target point cloud and the second planes corresponding to the reference point cloud by use of the centroid coordinates and the normal vectors of the obtained second planes, and the Euler angle difference between the target scanner and the reference scanner; and determining an Euler angle difference minimizing a value of the sum function of the distances, and using the Euler angle difference as an optimal Euler angle difference.

12. The device according to claim 8, wherein the generating the position information of the target object, based on the target point cloud data, the position information and the Euler angle of the target scanner, the reference point cloud data, and the position information and the Euler angle of the reference scanner comprises:

converting the target point cloud data into position information of target points in the target point cloud using of the position information and the Euler angle of the target scanner, and converting the reference point cloud data into position information of reference points in the reference point cloud by use of the position information and the Euler angle of the reference scanner;

rendering a point cloud of the target object based on the position information of the target points in the target point cloud, and the position information of the reference points in the reference point cloud;

fitting a plane of the target object by use of the point cloud of the target object; and obtaining a centroid coordinate of the plane of the target object, and using the centroid coordinate as the position information of the target object.

13. The device according to claim 9, wherein a method adopted for fitting the plane comprises a random sample consensus algorithm or a least square method.

14. The device according to claim 8, further comprising:

searching a position indicated by the position information of the target object on a pre-generated map, and marking the target object at the searched position.

15. A computer readable storage medium, on which computer programs are stored, wherein when the computer programs are executed by the processors, cause the processors to perform operations, the operations comprising:

obtaining target point cloud data of the target object, acquired by a target scanner at a target position, and position information of the target scanner, and obtaining reference point cloud data of the target object, acquired by a reference scanner at a reference position, and position information and an Euler angle of the reference scanner, wherein the target point cloud data includes offsets between a center of the target scanner and each target point in a target point cloud, and the reference point cloud data includes offsets between a center of the reference scanner and each reference point in a reference point cloud;

obtaining an Euler angle of the target scanner based on the target point cloud data, the reference point cloud data and the Euler angle of the reference scanner; and generating the position information of the target object based on the target point cloud data, the position information and the Euler angle of the target scanner, the reference point cloud data, and the position information and the Euler angle of the reference scanner.

* * * * *